(12) United States Patent
Combs

(10) Patent No.: US 12,494,733 B2
(45) Date of Patent: Dec. 9, 2025

(54) TRAILER-BASED SOLAR POWER FOOD REFRIGERATION AND FREEZING SYSTEM

(71) Applicant: Adagio Collections, LLC

(72) Inventor: Justin Combs, American Fork, UT (US)

(*) Notice: Subject to any disclaimer, the term of this patent is extended or adjusted under 35 U.S.C. 154(b) by 0 days.

(21) Appl. No.: 18/354,518

(22) Filed: Jul. 18, 2023

(65) Prior Publication Data

US 2025/0030377 A1    Jan. 23, 2025

(51) Int. Cl.
| | |
|---|---|
| F25D 11/00 | (2006.01) |
| H02J 7/00 | (2006.01) |
| H02J 7/35 | (2006.01) |
| H02S 10/20 | (2014.01) |
| H02S 10/40 | (2014.01) |

(52) U.S. Cl.
CPC ........... H02S 10/40 (2014.12); F25D 11/003 (2013.01); H02J 7/0068 (2013.01); H02J 7/35 (2013.01); H02S 10/20 (2014.12)

(58) Field of Classification Search
CPC ........ H02S 10/40; H02S 10/20; F25D 11/003; F25D 11/00; H02J 7/0068; H02J 7/35; H02J 7/00

USPC ........................................................ 307/10.1
See application file for complete search history.

(56) References Cited

U.S. PATENT DOCUMENTS

| | | | |
|---|---|---|---|
| 10,389,121 B1* | 8/2019 | Sherry ...................... H02J 3/02 |
| 11,705,719 B1* | 7/2023 | Munshi .................... H02H 7/06 |
| | | | 361/20 |
| 2008/0078436 A1* | 4/2008 | Nachamkin ............ H02S 10/10 |
| | | | 136/244 |
| 2017/0126057 A1* | 5/2017 | Jenison .............. F02M 21/0215 |

* cited by examiner

Primary Examiner — Rexford N Barnie
Assistant Examiner — Xuan Ly
(74) Attorney, Agent, or Firm — Morriss O'Bryant Compagni Cannon, PLLC

(57) ABSTRACT

The present invention is a system and method for automating operation of a power system for a trailer-based solar power food refrigeration and freezing system, the system providing a solar powered battery that provides primary power to the systems in the trailer, the solar power system also being able to activate a propane standby generator when additional power is needed to charge the battery to a threshold power level, providing a startup control procedure for the refrigeration and freezer units that prevents an overload of the power system, and being able to determine the current battery voltage at any time so that the propane standby generator can be activated when needed.

16 Claims, 6 Drawing Sheets

TRAILER-BASED SOLAR POWER FOOD REFRIGERATION AND FREEZING SYSTEM

BACKGROUND

Field of the Invention

This invention relates generally to a portable system for keeping food frozen and/or refrigerated. More specifically, the system is designed to overcome the difficulties of having a portable cooling system that uses a combination of a solar powered battery and a propane backup power source that are not typical of the industry.

Description of Related Art

There are several different types of mobile food cooling systems that are found in the industry. The first type is a dedicated mobile storage area such as a trailer that is hauled by a semi-truck, or a smaller trailer that is hauled by a pickup truck or other heavy duty vehicle. The second type is a mobile storage area that is part of the truck itself such as is found in a box truck.

Looking at the first type of mobile storage area, a semi-trailer may be converted to operate as a refrigeration truck. Power requirements for maintaining the perishable load encompass a compressor for circulating refrigerant and a fan for circulation of temperature-controlled air. A refrigeration unit may be attached to the front of a semi-trailer for maintaining controlled temperatures during transport. Typically, the refrigeration unit receives power directly from the semi-truck while in motion.

Typically, the refrigeration unit is powered by a small diesel engine that is integrated with the refrigeration system on the semi-trailer. The small engine operates when the truck is in motion and may operate from an external utility or "shore power" source when stationary.

However, such systems are very costly and inadequate for smaller transportation requirements, or smaller food requirements. Semi-trailers also require substantial amounts of space on-site and for storage. Furthermore, such designs leave little space available for actual food preparation as the total volume of the trailer is used for refrigeration or freezing.

The other type of trailer is much smaller in comparison to a semi-trailer and is hauled by a pickup truck or other similar vehicle. The power source for the trailer is typically going to be a combination of generators and shore power, with the generators being gasoline or diesel powered devices that supply power when the trailer is parked, and shore power is not available. Refrigeration and freezing units typically provide the transportation for the perishable items.

Another option is to use a non-articulated vehicle which is commonly called a "box" truck. The advantage of the box truck is that it typically provides a smaller cargo area. The refrigeration system may be operable for so-called medium temperature storage, for transport of perishable foods around 34 degrees F., or a lower temperature which encompasses frozen foods. The refrigeration system typically includes a compressor, electric motor and condenser, and an evaporator in the cargo area.

The semi-trailer and box-car approaches typically require refrigeration of the entire cargo area of the trailer, while the smaller trailer uses dedicated refrigeration and freezer units. The semi-trailer and box-car options leave no room for performing any food preparation and typically have limited storage for food that does not require refrigeration or freezing.

The smaller trailer with its dedicated refrigeration and freezer units is more versatile and can handle smaller loads in an easier manner. However, the trailer option has several drawbacks. First, the use of liquid fuel around any food is not a good option because of possible contamination. Furthermore, the smells associated with these fuels can permeate the storage area and also adversely affect the food. The generators can also be noisy and therefore difficult to work with if they are operated in close proximity to the trailer.

The large prior art refrigeration systems are typically incapable of utilizing solar power or of mixing solar power with other power options. It may also be difficult to try and retrofit the larger vehicles.

Accordingly, it would be an advantage over the prior art to eliminate the use of liquid fuels such as gasoline or diesel near the refrigeration and freezer units. It would be another advantage to maximize solar and battery power and provide a third power source when these options are depleted or unavailable. It would be another advantage to provide a backup power source that is not typically used in the role of providing backup power because of difficulty with using the fuel. It would be another advantage to provide an optimized startup process when utilizing propane as a backup power source that does not overload the electrical system. It would be another advantage to provide cooling units for perishables that may be used as either freezer or refrigeration units.

BRIEF SUMMARY

The present invention is a system and method for automating operation of a power system for a trailer-based solar power food refrigeration and freezing system, the system providing a solar powered battery that provides primary power to the systems in the trailer, the solar power system also being able to activate a propane standby generator when additional power is needed to charge the battery to a threshold power level, providing a startup control procedure for the refrigeration and freezer units that prevents an overload of the power system, and being able to determine the current battery voltage at any time so that the propane standby generator can be activated when needed.

In a first aspect of the invention, propane is used as a fuel for the standby generator to thereby protect food from the hazards of a liquid fuel-based generator.

In a second aspect of the invention, a communication link is provided between a solar power system and a propane standby generator.

In a third aspect of the invention, a power startup procedure is utilized that prevents the plurality of refrigeration and freezer units from demanding too much power on startup and thereby preventing an overload of the power system.

In a fourth aspect of the invention, the power system integrates the propane backup generator by using a system that enables the pressurized propane to automatically be available for use.

These and other embodiments of the present invention will become apparent to those skilled in the art from a consideration of the following detailed description taken in combination with the accompanying drawings.

DETAILED DESCRIPTION

Reference will now be made to the drawings in which the various embodiments of the present invention will be discussed so as to enable one skilled in the art to make and use the invention. It is to be understood that the following description illustrates embodiments of the present invention and should not be viewed as narrowing the claims which follow.

The purpose of the embodiments of the present invention is to provide a trailer-based refrigeration and freezing system for food that is automated to thereby provide seamless power generation regardless of the power source, provides room in the trailer to perform tasks other than refrigeration and freezing, and is a green system that can take advantage of advancements in solar power technology.

While the embodiments described here are shown as being trailer-based, it should be understood that the system is adaptable for installation in a vehicle such as a box-truck, a "food truck", or even in a semi-trailer platform.

Figure 1:
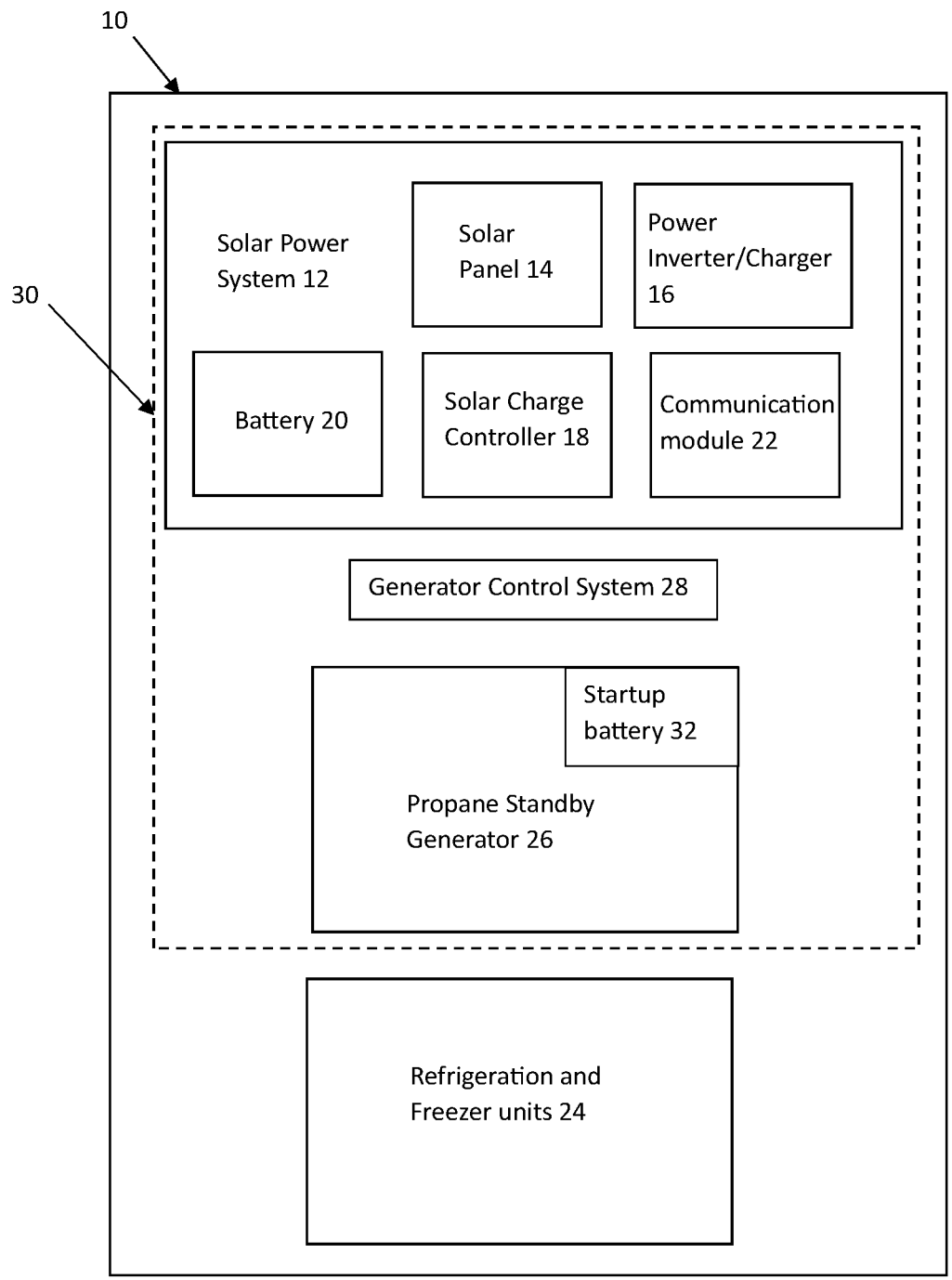
FIG. 1 is a block diagram of the elements found in the first embodiment of the invention.

The first embodiment of the invention is shown in a block diagram in FIG. 1. FIG. 1 shows that the first embodiment for a trailer-based solar power food refrigeration and freezing system 10 includes, but is not limited to, at least three systems. The first system is a solar power system 12 that functions as the primary power source for the system 10. The solar power system 10 includes, but should not be considered as limited to, at least one solar panel 14, a power inverter/charger 16, a solar charge controller 18, at least one battery 20, and a communication module 22.

The trailer-based solar power food refrigeration and freezing system 10 may include at least one refrigeration and freezer units 24. The first embodiment may include a total of four refrigeration and freezer units 24, with two functioning as refrigeration units and two functioning as freezer units. However, the first embodiment may also use units that may function as either refrigeration or as freezer units to improve adaptability of the system 10 to the particular needs of the user. Alternative embodiments may also use more than four refrigeration and freezer units 24.

The final system in the trailer-based solar power food refrigeration and freezing system 10 may be a propane standby generator 26 with a 12V startup battery 32. The inclusion of the propane standby generator is a particularly novel concept of the embodiments for several reasons. First, it is noted that the refrigeration and freezer units 24 will be drawing power from the primary source, the solar power system 12. This means that the refrigeration and freezer units 24 will be drawing power from the battery 20. While power is drawn from the battery 20, the solar power system 12 may function as follows.

The solar power system 12 requires both the power inverter/charger 16 and the solar charge controller 18. The power inverter/charger accomplishes two basic tasks, 1) converts direct current power from the battery 20 into household alternating current that can power standard appliances and other energy loads, and 2) converts alternating current into direct current energy that can charge the battery 20.

In contrast, the solar charge controller 18 sends power in one direction, charging the battery 20 from the power generated by the solar panels 14 and preventing the current from draining back into the solar panel 14 at night.

Thus, the power inverter/charger 16 converts the power to the necessary output, and the solar charge controller 18 makes certain that power is only moving from the solar panels 14 to the battery 20 and not back the other way.

In the event that there is insufficient power in the battery 20 to operate the refrigeration and freezer units 24, or if the battery 20 is approaching a low power threshold, the trailer-based solar power food refrigeration and freezing system 10 needs an alternate power source.

In the first embodiment, the alternate power source is the propane standby generator 26. In this first embodiment, the propane standby generator 26 does not provide power directly to the refrigeration and freezer units 24 but to the battery 20. Accordingly, it is the battery 20 that always provides power to the refrigeration and freezer units 24. The function of the solar panel 14 and the propane standby generator 26 is to keep the battery 20 charged above a low power threshold.

The solar power system 12 may provide a signal to the propane standby generator 26 using the communication module 22. The solar power system 12 may determine that additional power is needed once the battery 20 slips below the low power threshold. This need for power may be based on a preset low power threshold that may be established as the lowest power level that the battery 20 is allowed to reach before additional charging power is needed.

The propane standby generator 26 may be a fail-safe power source. Accordingly, in such a fail-safe mode of operation, the propane standby generator 26 may need to be in a ready state any time that the trailer is powered on to provide the power needed by the refrigeration and freezer units 24.

When using gasoline or diesel generators as a standby generator, this is not a problem. However, unlike the prior art, the first embodiment is intended to use a propone generator. One important advantage of using propane for a generator is that it avoids the problems associated with using liquid fuels in and around the trailer and the food. As a fuel, propane is stored as a liquid but is burned as a gas when pressure is released. This makes propane burn cleaner, has little to no smell in the exhaust, and is easier on the generator itself and thereby extending the life of the generator.

However, one of the first problems that arose when trying to use a propane generator as the propane standby generator 26 is that they are larger and bulkier than liquid fueled generators. A second problem that arose was that a propane standby generator 26 needs to be pressurized at all times in order to be ready to power up and provide immediate backup power. Typically, portable propane generators are hooked up to a fuel source and only then are they turned on. When finished, they are then shut off and disconnected or the fuel is depressurized. Accordingly, it was necessary to modify the propane standby generator 26 so that it could function on demand. This modification may take the form of a mechanical valve that may be activated to connect the propane to a power generating system when the additional power of the propane standby generator 26 is needed. The first embodiment of the present invention may be the first trailer-based power system to take advantage of this modified propane backup generator 26.

The first step of the first embodiment was to create a generator control system 28 for the solar power system 12. This step was necessary because no power system exists in the prior art for the solar power system 12 to communicate with the propane standby generator 26. The generator control system 28 thus enables the novel automation of the power system 30 of the trailer-based solar power food refrigeration and freezing system 10.

The generator control system 28 may be comprised of a smart relay that may receive start/stop commands from the solar power system 12 and receive a run command from the propane standby generator 26.

It should be noted that any system that may receive start/stop commands from the solar power system 12 and receive a run command from the propane standby generator 26 may be used as the generator control system 28.

In order to ensure that the propane standby generator 26 may be activated on demand, it is important that an activation battery be maintained in a fully charged condition so that it can activate the propane standby generator 26 without any delay. However, the activation battery may have much less voltage than the battery 20.

The solar power system 12 that is implemented in the first embodiment is a 48V system. The 48V system was selected because the refrigeration and freezer units 24 operate on a 120V alternating current power system. The 48V power of the battery 20 has to be converted to the 120 V alternating current needed by the refrigeration and freezer units 24. Accordingly, it was necessary to design a subsidiary 12V system including the startup battery 32 that is supported by but is electrically separated from the 48V power system. Thus, while the 48V system may fail, the 12V system of the startup battery 32 is still available and ready to power up the propane standby generator 26.

Accordingly, there may be the 12V startup battery 32 to provide power to the propane standby generator 26 and the separate 48V battery 20 for providing power to the refrigeration and freezer units 24.

Figure 2:
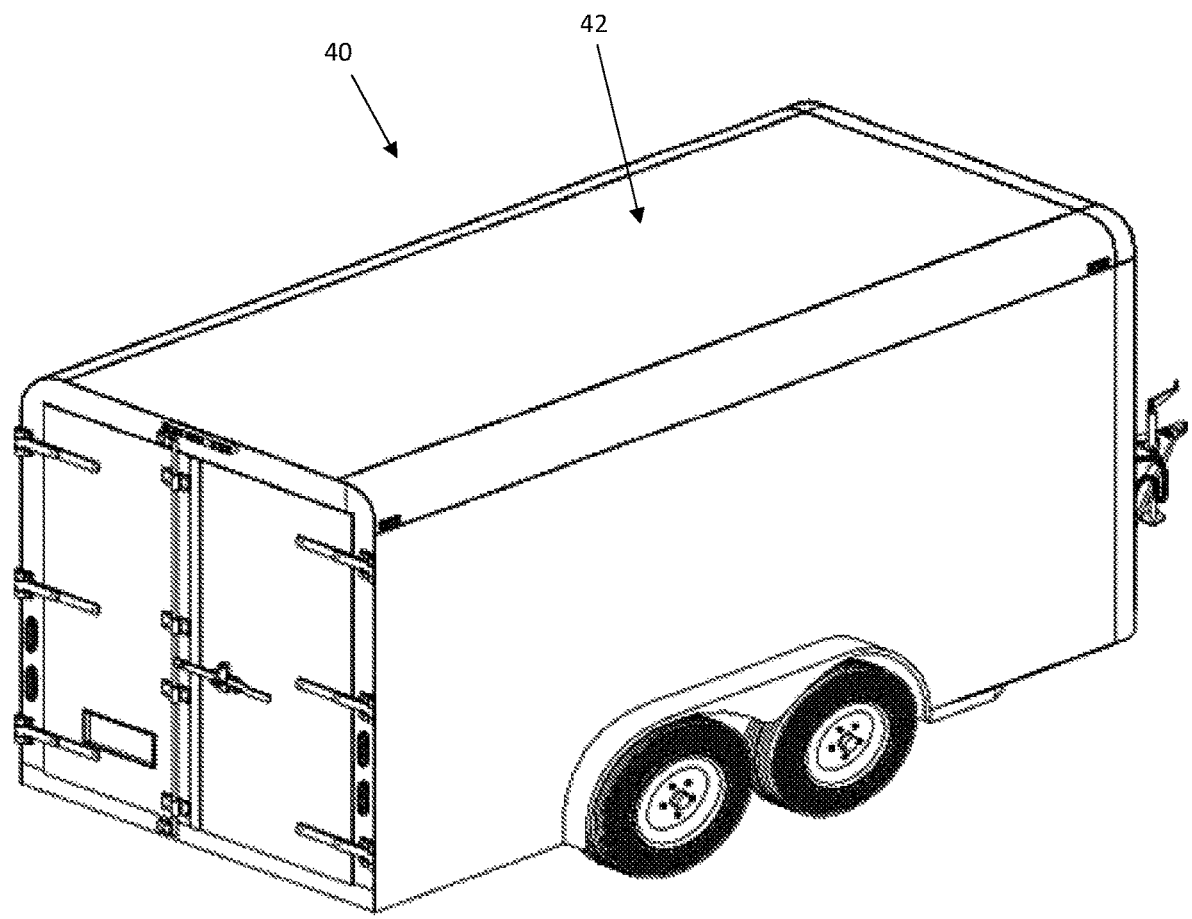
FIG. 2 is a perspective view of a possible trailer where the trailer-based solar power food refrigeration and freezing system may be installed.

FIG. 2 is a profile view of a trailer 40. Because the trailer-based solar power food refrigeration and freezing system 10 is designed to operate in a trailer, the size of the various components of the system and the power that could be used was an important aspect of the design. The trailer 40 shown in FIG. 2 is of a size that may be used in the first embodiment. The dimensions of this trailer 40 may vary from the example given, therefore, the dimensions of the trailer 40 should only be considered as approximate and not a requirement.

A typical trailer 40 that may be used in the first embodiment may be a double-axle trailer. The trailer 40 that can be hauled by a truck and occupy a substantially smaller footprint than a box-car truck or a semi-trailer is going to have a relatively small roof. The solar panels 14 that are going to be used may be permanently installed on the roof of the trailer 40. A typical trailer that may be used as the trailer shown in FIG. 2 may have dimensions as follows.

The typical width of an enclosed trailer such as the one shown in FIG. 2 may vary between 5, 6, 7, and 8.5 foot widths. These enclosed trailers are typically somewhere between 8 feet and 32 feet long. As far as height, an enclosed trailer is traditionally 7 feet tall. The trailer 40 shown in FIG. 2 is approximately 7 feet in width, 12 feet in length, and 7 feet in height, and is shown only for demonstration purposes.

The trailer 40 shown in FIG. 2 may have one or two axles, may have double doors, a fold down ramp, or a roll-up door to provide access at the back of the trailer. The trailer 40 may or may not include a door on a side, and it may or may not have storage at the front of the trailer. However, the propane standby generator 26 may typically be disposed at the front of the trailer 40 in any convenient storage.

The roof 42 of the trailer 40 may have disposed thereon a plurality of the solar panels 14. The roof 42 may be completely covered with the solar panels 14 in order to maximize power generation for the battery 20. Therefore, the overall surface area of the roof 42 of the trailer 40 is an important consideration when determining how much power may be generated by the solar panels 14. The solar panels 14 may be permanently installed in order to minimize setup of the power system 30 and to avoid damage to the sensitive solar panels.

The robust design of solar panels 14 likely eliminates the need to cover the solar panels. However, there may be circumstances when the weather may present a danger. At such times, a tarp or other substantial covering may be disposed over the solar panels 14 to protect them when covered storage or parking is not available. The trailer 40 may include tie down locations on the sides of the trailer to securely attach the tarp.

An important aspect of the first embodiment was determining an adequate size of the power system 30. Space on the roof 42 is limited on the trailer 40 and power generation is critical. Even with the more efficient refrigeration and freezer units 24, power may be a critical aspect for operation of the trailer 40.

It was determined that there are two basic styles of chest units for refrigeration and freezing. The most common type is built to introduce a lot of temperature changes relatively quickly. This style uses more energy in shorter run times. The other style is a slower cooling process. It uses much less energy but must run longer periods to accomplish the same amount of temperature change. It was determined that the system 10 must use the slower cooling method in order to optimize the power system 30. Accordingly, appropriately sized refrigeration and freezer units 24 had to be used that would operate within the electric parameters that were available with the power system 30.

It was determined that even using the more efficient refrigeration and freezer units 24, if all four units started up at the same time, this situation could cause a power demand surge that could overload the power system 30 and cause it to shut down. If the power system 30 shuts down and is not restarted, such as during a long road trip, the food could spoil. To avoid this problem, a startup control procedure manages the start of the refrigeration and freezer units 24. This startup control procedure ensures that the refrigeration and freezer units 24 only start when it will cause a minimal power demand that can be more easily managed by the power system 30.

There are two aspects of the startup control procedure of the first embodiment of the invention. The first aspect is related to the operation of a compressor in the refrigeration or freezer units 24. To understand the problem faced by the first embodiment of the invention, it is necessary to understand the operation of a compressor in a cooling unit.

Evaporator and Low-Pressure Side: The refrigeration cycle commences in the evaporator, which is located in the refrigerator's cooling compartment. The low-pressure side is where the refrigerant begins traveling through the system. As the refrigerant enters the evaporator, it absorbs heat from the surrounding air and items, causing it to evaporate and transform into a low-pressure vapor.

From the evaporator, the low-pressure refrigerant vapor is drawn into the compressor through a suction line. The suction line acts as a conduit for the gas to flow from the evaporator to the compressor. At this stage, the refrigerant is in a low-pressure and low-temperature state.

Once inside the compressor, the low-pressure refrigerant vapor undergoes compression. The compressor's primary function is to raise the pressure and temperature of the refrigerant vapor. By utilizing mechanisms such as pistons or scroll compressors, the compressor compresses the refrigerant, significantly increasing its pressure and temperature.

The high-pressure side of the refrigerator begins at the outlet of the compressor. The compressed refrigerant vapor, now at a high pressure and high temperature, flows into the condenser. The condenser is responsible for dissipating heat from the refrigerant to the surrounding environment. As a result, the refrigerant condenses into a high-pressure liquid.

After leaving the condenser, the high-pressure liquid refrigerant passes through an expansion valve or capillary tube. The expansion valve regulates the flow and reduces the pressure of the refrigerant, preparing it for the low-pressure side of the system, i.e., the evaporator. As the pressure drops, the refrigerant partially vaporizes and enters the low-pressure side as a mixture of liquid and vapor.

The mixture of liquid and vapor refrigerant enters the evaporator, where it absorbs heat from the refrigerator's contents, thereby cooling the interior. The low-pressure vapor refrigerant then returns to the compressor through the suction line to repeat the refrigeration cycle. This cyclical process continues as long as the refrigerator is in operation, maintaining a consistent cooling effect.

If the cooling process above is interrupted and the compressor is still under high pressure, the compressor must draw a large amount of amperage to start up. For example, for a given refrigeration system, starting up "cold" can result in a power draw of 70 to 150 watts. However, if the system has been operating for a while and is "warm", to overcome the high pressure of the compressor can require an 800+ watt power draw. Such a large power draw may overwhelm the power system 30 and shut it down completely.

Therefore, the power system 30 of the first embodiment waits for a short period of time before trying to start the compressor. For example, by waiting somewhere between 3 and 5 minutes, the compressor has time to at least partially bleed off the high pressure in a warm system. By waiting a sufficient amount of time referred to as an initial startup delay, the power system 30 does not experience a high amperage power draw after the high pressure in the compressor has had time to bleed off.

Figure 3:
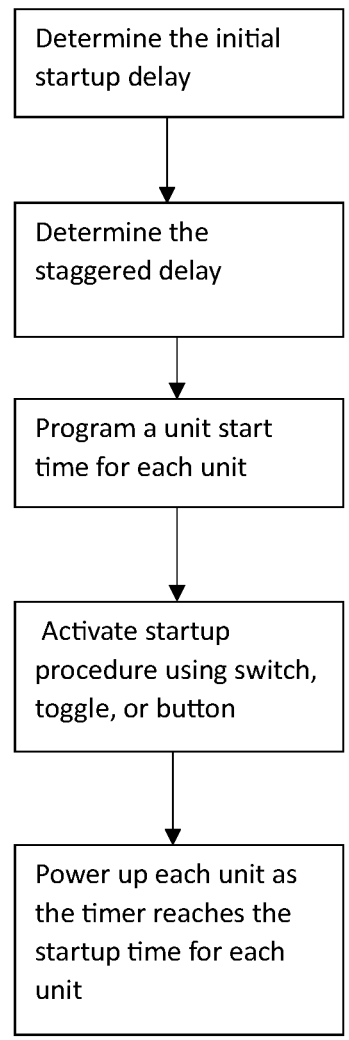
FIG. 3 is a flowchart of the static power startup control procedure.

Accordingly, FIG. 3 shows a static procedure for a power startup control procedure that is not altered by the user. In the first embodiment, the static power startup control procedure is programmed into the power system 30 and is not modifiable once it is programmed.

The first step of the procedure is to determine a startup sequence for the refrigeration and freezer units 24. Once this sequence has been determined that sequence is programmed into the power system and is repeated every time that the refrigeration and freezer units 24 are turned on.

The first step of the procedure is to determine how long an initial startup delay should be for the refrigeration and freezer units 24 so that a substantial amount of the pressure in the compressor has time to dissipate. In the first embodiment, the initial startup delay may be at least two minutes but is more likely to be three to four minutes. The initial startup delay may be defined as whatever time is sufficient to prevent a high amperage draw from the battery 20 when starting the refrigeration and freezer units 24. For the first embodiment it is typically 3 minutes and 15 seconds but may be different if the devices being started up are different.

After determining what the initial startup delay before any of the refrigeration and freezer units 24 are turned on is going to be, the next step is to determine how much time there should be between the startup of each unit. This delay may be referred to as a staggered delay. The staggered delay is the amount of time between the starting of each unit that will prevent the start of one unit of the refrigeration and freezer units 24 from affecting the startup of another unit. When any large appliance is started, there will likely be a larger power draw. The staggered delay allows a larger power draw to be over before a next unit is started up. This staggered delay may be determined by any appropriate means. For the first embodiment and for the given amount of power that each unit of the refrigeration and freezer units 24, it was determined that a staggered delay of 10 to 30 seconds is sufficient. It should be understood that the staggered delay may be adjusted depending on the characteristics of the refrigeration and freezer units 24.

Using the initial startup delay and the staggered delay, each of the refrigeration and freezer units 24 is then assigned a time to begin powering up once some button, toggle or switch is activated that is called a unit start time. Each of the refrigeration and freezer units 24 is therefore assigned a different unit start time.

For purposes of this document, a reference time that the power startup control procedure begins may be referred to as a unit reference time. The unit reference time begins when a user begins the power startup control procedure for the refrigeration and freezer units 24. This may begin, for example, by throwing a switch, flipping a toggle, or pressing a button on the power system 30. Therefore, activating the power startup control procedure may start a timer for each of the refrigeration and freezer units 24 that begins at the unit reference time and ends for each of the refrigeration and freezer units at its individual unit start time.

The timer may be, for example, a program in the power system 30 that begins to count from the reference time and activates each of the refrigeration and freezer units 24 at the individual unit start times, or as each unit start time is reached.

For example, assume that the initial startup delay is 3 minutes and 15 seconds, or 3:15. After 3:15 has elapsed on the timer from the reference time, a first unit of the refrigeration and freezer units 24 is started at its individual unit start time. Assuming that the staggered delay is 30 seconds, after the timer reaches 3:45, a second unit of the refrigeration and freezer units 24 is started at its individual unit start time. When the timer reaches 4:15, a third unit of the refrigeration and freezer units 24 is started at its individual unit start time. When the timer reaches 4:45, the last unit of the refrigeration and freezer units 24 is started at its unit start time.

The initial startup delay and the staggered delay have already been determined and the unit start times for each of the refrigeration and freezer units 24 have been programmed into the power system 30. Each unit of the refrigeration and freezer units 24 is thus controlled separately and has been assigned a unit start time as defined above.

In the alternative, a dynamic power startup control procedure may be used. Thus, in an alternative embodiment, if the staggered delay is insufficient and the unit start times of the refrigeration and freezer units 24 are interfering with each other because there is an insufficient amount of time between the powering up of each unit, then the staggered delay may be changed which would change the unit start times for each of the refrigeration and freezer units 24. The dynamic power startup control procedure may also result in a faster start of all of the refrigeration and freezer units 24 because the procedure may use a shorter initial startup delay and a shorter staggered delay. The dynamic procedure allows the power system 30 to take short pauses if power draws on the battery are too high.

Figure 4:
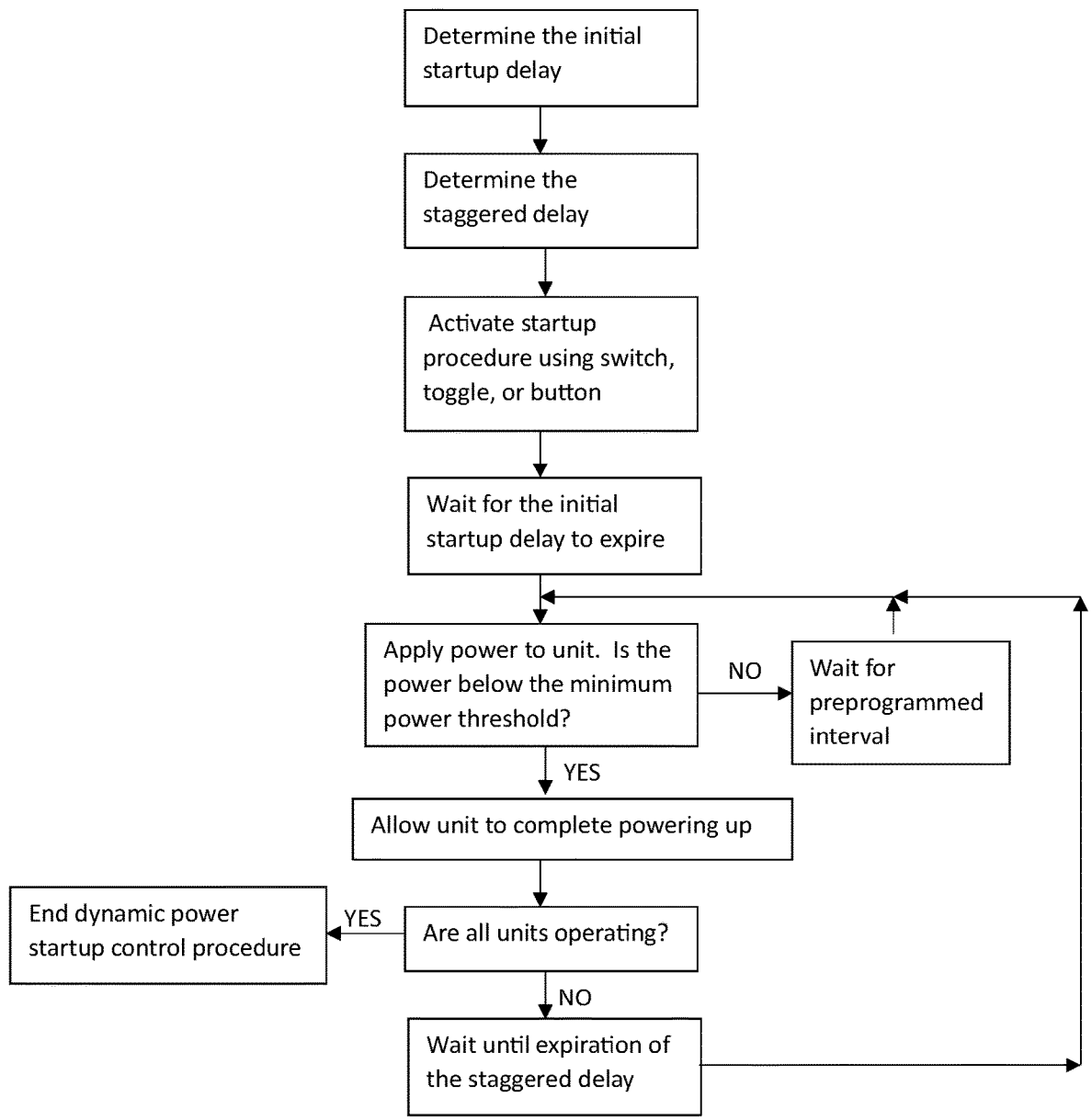
FIG. 4 is a flowchart of the dynamic power startup control procedure.

FIG. 4 shows that the first steps of the dynamic power startup control procedure are the same as for the static power startup control procedure. The first step of the procedure is to determine how long an initial startup delay should be for the refrigeration and freezer units 24 so that a substantial amount of the pressure in the compressor has time to dissipate. Because this procedure is dynamic, however, the initial startup delay may be shorter than the static procedure because it has a delay that repeats until the power draw is below a minimum power threshold.

The initial startup delay may be defined as whatever time is sufficient to prevent a high amperage draw from the battery 20 when starting the refrigeration and freezer units 24. For the first embodiment it is typically 3 minutes and 15 seconds but may be different if the devices being started up are different. However, unlike the static procedure, the dynamic procedure shown in FIG. 4 is able to test the power being drawn from the battery 20 when each of the refrigeration and freezer units 24 is powered up.

If the power being drawn is too high, or in other words, if the amperage drawn is above a minimum threshold, the power system 30 waits for a preprogrammed internal of time before attempting to start the unit again. This process is repeated until the power being drawn is below the power threshold.

After determining what the initial startup delay before any of the refrigeration and freezer units 24 are turned on is going to be, the next step is to determine how much time there should be between the startup of each unit. This delay is again referred to as the staggered delay. The staggered delay is the amount of time between the starting of each unit that will prevent the start of one unit of the refrigeration and freezer units 24 from affecting the startup of another unit. The staggered delay on the dynamic procedure may be shorter than on the static procedure because the procedure is able to test the power draw and insert a small delay if the power draw is too large.

When any large appliance is started, there will likely be a larger power draw. The staggered delay allows a larger power draw to be over before a next unit is started up. This staggered delay may be determined by any appropriate means. For the first embodiment and for the given amount of power that each unit of the refrigeration and freezer units 24, it was determined that a staggered delay of 10 to 30 seconds is sufficient. However, a shorter staggered delay may be used with the dynamic procedure. It should be understood that the staggered delay may be adjusted depending on the characteristics of the refrigeration and freezer units 24.

Unlike the static procedure in FIG. 3, the dynamic procedure does not program a unit start time for each unit. Instead, after the initial startup delay, a first unit is powered up. If the power draw is below the minimum power threshold, then power remains applied to the unit. If the power draw is above the minimum power threshold, then a short, preprogrammed interval of time is allowed to pass before the power system 30 against tries to start the unit. This procedure repeats until the first unit is powered up. The short preprogrammed delay may be something like 2-5 seconds.

Once the unit is started, the dynamic procedure determines if all the units are powered up. If they are then the dynamic power startup control procedure is terminated. If not all of the units are powered up, then the process repeats until all of the units are powered up as shown in FIG. 4.

Another aspect of the first embodiment is providing a battery 20 that may communicate with the power system 30. The power system 30 may need to know the current charge of the battery 20 at any time in order to start the propane standby generator 26. Thus, either the battery 20 must periodically transmit battery charge data to the power system 30, or the power system must periodically request battery charge data. The exact battery charge may be difficult to actually determine because of the nature of large batteries. Therefore, the first embodiment of the invention may use the voltage of the battery 20 to determine when to power up the propane standby generator 26. What is important is that the battery voltage information may be readily obtained in order to determine when to power up the propane standby generator 26.

FIG. 4 is a perspective view into the back of the trailer 40. The arrangement of elements inside the trailer 40 is shown as only an example and should not be considered as limiting of the interior design.

FIG. 4 shows the four refrigeration and freezer units 24 disposed on both sides of the trailer 40 and back against the side interior walls 46 creating an aisle 48 down the middle. Storage space in the form of cabinetry 44 is also shown on the interior walls 46 above the refrigeration and freezer units 24. A front interior wall 50 of the trailer 40 is also shown with storage cabinetry 52. The elements of the power system 30 may be disposed inside the cabinetry 52. For example, the propane standby generator 26 may be stored therein.

Figure 5:
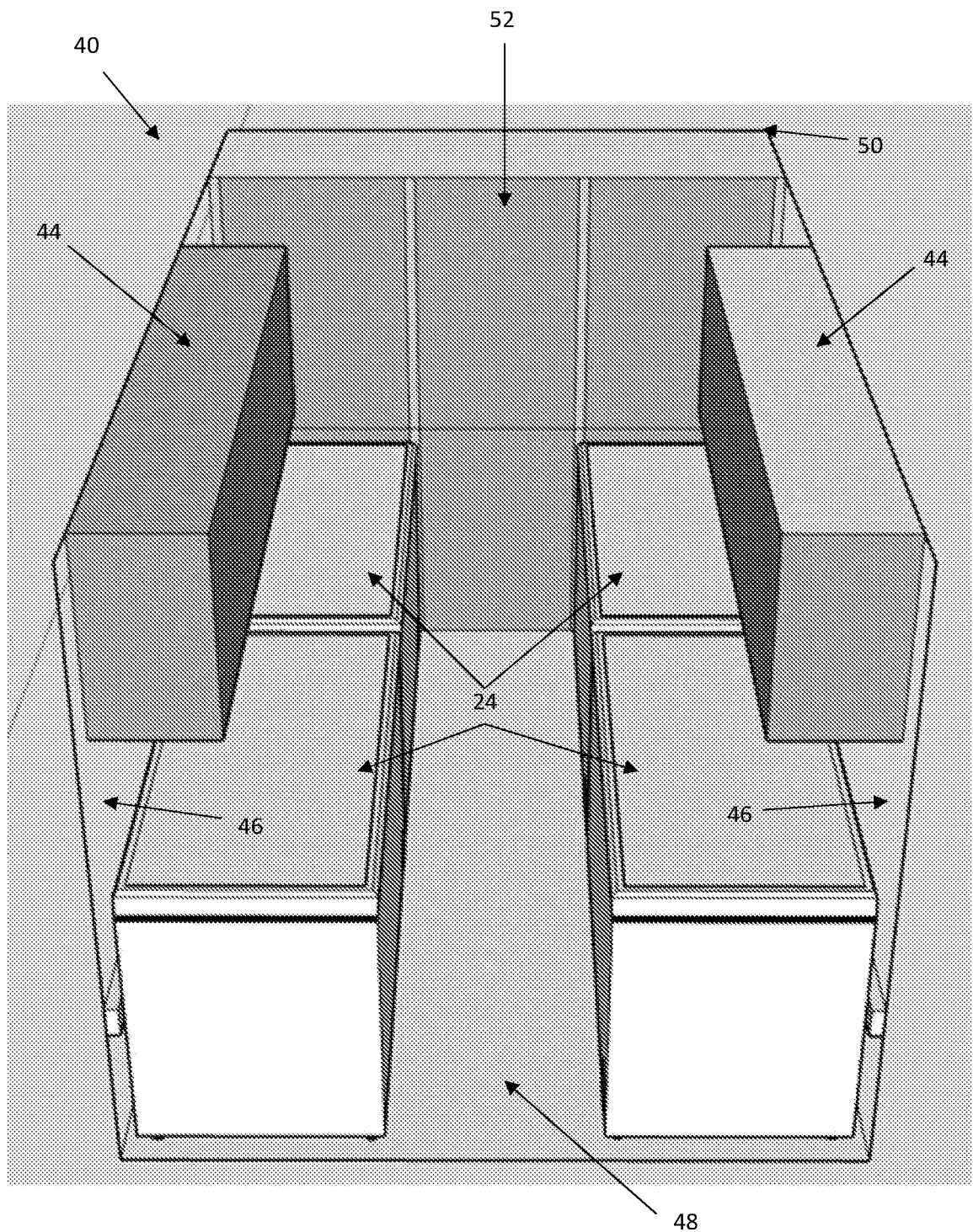
FIG. 5 is a perspective view of the interior of a trailer showing possible placement of the elements of the first embodiment.
Figure 6:
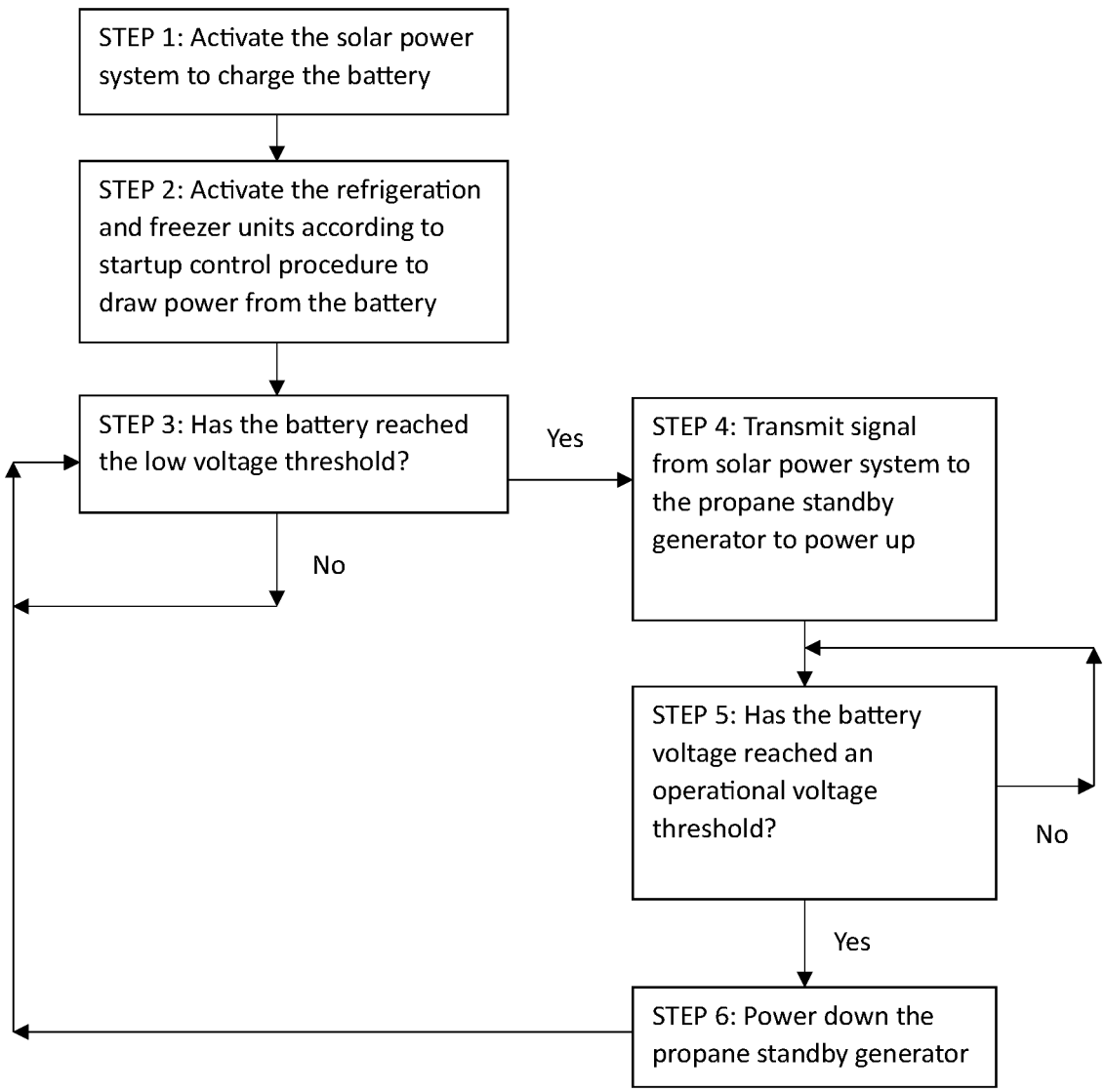
FIG. 6 is a flowchart of the process for controlling operation of the power system, including when to activate and deactivate the propane standby generator.

FIG. 5 is a flowchart showing a process for operating the power system 30 completely automatically. Automatic operation may be defined as being able to start from a cold or warm condition of the refrigeration and freezer units 24, controlling the charging of the battery 20 and the delivery of power from the battery to the refrigeration and freezer units, and if the battery 20 reaches a low voltage threshold, the solar power system 12 sends a startup signal to the propane standby generator 26.

The low voltage threshold that is set for the battery 20 is essentially an arbitrarily defined voltage threshold. However, it is important because it allows the power system 30 to provide a voltage buffer so that the battery 20 is not in danger of ever running so low as to be incapable of providing power to the refrigeration and freezer units 24. It is important to remember that the solar power system 12 and the propane standby generator 26 do not provide power directly to the refrigeration and freezer units 24. The solar power system 12 and the propane standby generator 26 provide indirect power by charging the battery 20 which actually provides power directly to the refrigeration and freezer units 24.

Therefore, the propane standby generator 26 is activated and supplements power from the solar panels 14 to the charging of the battery 20. Once the battery 20 reaches a certain "operational" voltage threshold, the propane standby generator 26 is no longer needed and may be shut down and moved to a standby state to wait for a signal from the solar power system 12 to be reactivated.

This means that in the first step of the automated power system 30, the solar power system 12 provides charging of the battery 20 using the power inverter/charger 12 and the solar charge controller 18. When the trailer-based solar power food refrigeration and freezing system 10 needs to power up the refrigeration and freezer units 24, they are activated in step two according to the startup control procedure that is explained in FIG. 3 which activates each of the refrigeration and freezer units in a manner that does not overload the power system 30 and shut it down.

In step three, the power system 30 then determines if the battery 20 has fallen below the low voltage threshold. If the load on the battery 20 is less than the power being provided by the solar power system 16, then the power system 30 will continue to operate without activating the propane standby generator 26. Thus, step three will repeat in a continuous loop as the system checks if the battery 20 has fallen below the low voltage threshold.

However, if the load on the battery 20 is greater than the power being provided by the solar power system 16, then the battery 20 will be draining and the voltage decreases. Eventually, if the refrigeration and freezer units 24 are run long enough, then the voltage of the battery 20 will eventually fall below the low voltage threshold.

If the battery 20 is no longer providing sufficient power to handle the load on the power system 30, then the power system moves to step four. In step four, a signal is transmitted from the solar power system 12 to the propane standby generator 26 to power up and begin providing additional power.

An important aspect of the first embodiment of the invention is that prior art solar power systems 16 do not provide a signal that can be used to activate the propane standby generator 26.

After completing step four, the system moves to step five which determines if the voltage on the battery 20 has reached the operation voltage threshold so that there is sufficient charge on the battery 20 to provide power to the refrigeration and freezer units 24 for a period of time.

Again, the operation voltage threshold may be an arbitrary threshold that allows the power system 30 to continue to operate for a period of time without the assistance of the propane standby generator 26 to charge the battery 20. What is considered an operational voltage threshold may be changed by the user. One of the important considerations by the user is how long a period of time does the user want to have the propane standby generator 26 to operate when the low voltage threshold is reached.

For example, the user may select the low voltage threshold to be at a point when the battery 20 has 30 minutes of power left at the current power draw of the refrigeration and freezer units 24. The user may also set the operational voltage threshold to be where the battery 20 can provide 2 hours of power. With these settings, the battery 20 will operate for approximately 1.5 hours before the propane standby generator 26 is activated. The propane standby generator 26 will then charge the battery 20, while it is being used, until the battery 20 can operate unassisted for another 1.5 hours. It is unknown exactly how long the propane standby generator 26 will have to operate until the battery 20 reaches the operation voltage threshold. But because the power system 30 is automated, it does not matter. The propane standby generator 26 will function as long as needed until the desired voltage on the battery 20 is reached.

The power system 30 will allow the battery 20 to continue charging until reaching the operational voltage threshold before deactivating the propane standby generator 26. Otherwise, the power system 30 could get caught in a loop where the battery 20 only has sufficient charge to operate the power system 30 for only a very short time before the propane standby generator 26 would have to be activated again. This constant on and off operation of the propane standby generator would not be good for the power system 30 or the life of propane standby generator 26. Therefore, it is preferred that the operational voltage threshold be set significantly above the low voltage threshold.

It is noted that there was an attempt to use a different parameter than the low voltage threshold and the operation voltage threshold to determine when the propane standby generator 26 should be activated and deactivated. These other parameters included a percentage of remaining battery life. However, it was determined that this is actually a very difficult parameter to determine because of the nature of the batteries being used for the present invention.

Once the propane standby generator 26 has been activated and is providing additional power to the power system 30 and charging the battery 20, the process would remain at step five until the battery 20 has reached the operation voltage threshold. Once the operation voltage threshold is reached, the process would proceed to step six where the propane standby generator 26 is deactivated. The process would then move to step three where step three would continue in a loop until the battery voltage has reached the low voltage threshold.

This process continues described in FIG. 5 will continue until the load on the power system 30 has finally stopped and the trailer-based solar power food refrigeration and freezing system 10 is powered down.

It is emphasized that the ability to be able to use a propane standby generator is a significant achievement over the prior art and is made possible by the solar power system 12 being able to communicate with the propane standby generator 26, being able to maintain a 12V power system that is separate from the battery 20 and which can power up the propane standby generator even when the battery 20 is running out of power, providing a startup control procedure for the refrigeration and freezer units 24 that prevents an overload of the power system 30, being able to determine the current battery voltage at any time so that the propane standby generator can be activated the moment it is needed, and having a propane standby generator that is ready to be activated at any time.

One aspect of the power system 30 that should also be addressed is the issue of the use of shore power. While the power system 30 has been described as being reliant on the solar power system 12 and the propane standby generator 26, one issue that has not been clarified is power options on a cloudy day. When the solar power system 12 cannot be used such as on a cloudy day or at night, the user of the trailer may not want to use the limited propane fuel of the propane standby generator 26 to provide all the power to the battery 20. The power system 30 may be plugged in to shore power in order to charge the battery 20.

However, the power system 30 may need to send a signal to the propane standby generator 26 to turn off. The need for this signal is a result of the propane standby generator 26 recognizing that the solar power system 12 is not providing power to the battery 20. Accordingly, the propane standby generator 26 is also capable of shutting down and ignoring a signal that the solar power system 12 is not providing power.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A portable food refrigeration and freezing system, said system comprised of: at least one refrigeration and freezer unit that generates an electrical load on the power system; a power system comprising: a solar power system, wherein the solar power system provides power to the power system and generates a signal when additional power is needed; and a propane standby generator that provides power to the power system when it receives the signal from the solar power system; a generator control system for receiving start/stop commands from the solar power system and for receiving a run signal from the propane standby generator; and a second battery for powering up the propane standby generator, wherein the second battery is electrically isolated from a first battery.

2. The system as defined in claim 1 wherein the solar power system is further comprised of: at least one solar panel for generating electricity; the first battery for storing the electricity generated by the at least one solar panel; a power inverter/charger for converting direct current power from the first battery into alternating current that can power energy loads, and for converting alternating current into direct current energy that can charge the first battery; a solar charge controller for charging the first battery from the electricity generated by the at least one solar panel; and a communication module for generating the signal when the additional power is needed.

3. The system as defined in claim 2 wherein the generator control system is further comprised of a smart relay.

4. A method for automating a power system for trailer-based food refrigeration and freezing system, said method comprising: providing a power system, at least one refrigeration and freezer unit that generates an electrical load on the power system, a solar power system, wherein the solar power system provides power to the power system from a first battery, and a propane standby generator that provides the additional power to the power system when it receives the signal from the solar power system; activating the solar power system; charging the first battery with the electricity from the solar power system; drawing power from the first battery to operate the at least one refrigeration and freezer unit; and powering up the propane standby generator when additional power is needed to charge the first battery so that the first battery is not depleted; providing a startup control procedure for the refrigeration and freezer units that prevents an overload of the power system; determining the initial startup delay so that a compressor has time to bleed off at least a portion of high pressure; determining a staggered delay so that there is sufficient time between the powering up of each of the refrigeration and freezer units; programming a unit start time for each of the refrigeration and freezer units; activating the startup control procedure; and providing power to each of the refrigeration and freezer units as each of the unit start times is reached.

5. The method as defined in claim 4 wherein the method further comprises: determining when a low voltage threshold is reached for the first battery; and generating a signal from the solar power system to the propane standby generator so that the propane standby generator powers up.

6. The method as defined in claim 5 wherein the method further comprises charging the first battery using additional power from the propane standby generator.

7. The method as defined in claim 6 wherein the method further comprises: determining when the first battery has sufficient voltage such that it has reached a predetermined operational voltage threshold; and deactivating the propane standby generator when the battery has been charged to the operation voltage threshold.

8. The method as defined in claim 7 wherein the method further comprises making the difference in voltage between the operation voltage threshold and the low voltage threshold sufficiently large such that the propane standby generator is not operating in a loop that causes the propane standby generator to rapidly start and stop.

9. The method as defined in The method as defined in claim 4 wherein the startup control procedure further comprises: determining the initial startup delay so that a compressor has time to bleed off at least a portion of high pressure; determining a staggered delay so that there is sufficient time between the powering up of each of the refrigeration and freezer units; activating the startup control procedure; waiting until expiration of the initial startup delay so that a compressor has time to bleed off at least a portion of high pressure; providing power to a refrigeration and freezer unit and 1) determining when a power draw of the unit is below a minimum power threshold, then 2) withdrawing power and waiting for a preprogrammed interval of time when the power draw of the unit is above the minimum power threshold and repeating steps 1) and 2) until the power draw of the unit is below the minimum power threshold, and then allowing the unit to complete powering up; determining when all of the refrigeration and freezer units have power and terminating the startup control procedure when they do, but waiting until expiration of a staggered delay when they do not and then repeating the steps of providing power to a refrigeration and freezer unit until all of the units are powered up.

10. The method as defined in claim 5 wherein the method further comprises providing at least one solar panel for generating electricity to charge the first battery, a power inverter/charger for converting direct current power from the first battery into alternative current that can power energy loads, and for converting alternating current into direct current energy that can charge the first battery, a solar charge controller for charging the first battery from the electricity generated by the at least one solar panel, and a communication module for generating the signal to the propane standby generator.

11. The method as defined in claim 10 wherein the method further comprises providing a generator control system for receiving start/stop commands from the solar power system and for receiving a run command from the propane standby generator.

12. A method for automating a power system for trailer-based food refrigeration and freezing system, said method comprising: providing a power system, at least one refrigeration and freezer unit that generates an electrical load on the power system, a solar power system, wherein the solar power system provides power to the power system from a first battery, and a propane standby generator that provides the additional power to the power system when it receives the signal from the solar power system; activating the solar power system; charging the first battery with the electricity from the solar power system; drawing power from the first battery to operate the at least one refrigeration and freezer unit; powering up the propane standby generator when additional power is needed to charge the first battery so that the first battery is not depleted; providing a startup control procedure for the refrigeration and freezer units that prevents an overload of the power system; determining the initial startup delay so that a compressor has time to bleed off at least a portion of high pressure; determining a staggered delay so that there is sufficient time between the powering up of each of the refrigeration and freezer units; activating the startup control procedure; waiting until expiration of the initial startup delay so that a compressor has time to bleed off at least a portion of high pressure; providing power to a refrigeration and freezer unit and 1) determining when a power draw of the unit is below a minimum power threshold, then 2) withdrawing power and waiting for a preprogrammed interval of time when the power draw of the unit is above the minimum power threshold and repeating steps 1) and 2) until the power draw of the unit is below the minimum power threshold, and then allowing the unit to complete powering up; and determining when all of the refrigeration and freezer units have power and terminating the startup control procedure when they do, but waiting until expiration of a staggered delay when they do not and then repeating the steps of providing power to a refrigeration and freezer unit until all of the units are powered up.

13. The method as defined in claim 12 wherein the method further comprises: determining when a low voltage threshold is reached for the first battery; and generating a signal from the solar power system to the propane standby generator so that the propane standby generator powers up.

14. The method as defined in claim 13 wherein the method further comprises charging the first battery using additional power from the propane standby generator.

15. The method as defined in claim 14 wherein the method further comprises: determining when the first battery has sufficient voltage such that it has reached a predetermined operational voltage threshold; and deactivating the propane standby generator when the battery has been charged to the operation voltage threshold.

16. The method as defined in claim 15 wherein the method further comprises making the difference in voltage between the operation voltage threshold and the low voltage threshold sufficiently large such that the propane standby generator is not operating in a loop that causes the propane standby generator to rapidly start and stop.

* * * * *